Jan. 22, 1935.  C. W. LANTER  1,988,692
BALING MACHINE
Filed Feb. 14, 1930   7 Sheets-Sheet 1

Jan. 22, 1935.  C. W. LANTER  1,988,692
BALING MACHINE
Filed Feb. 14, 1930  7 Sheets-Sheet 4

Inventor:
Clarence W. Lanter
By Williams, Bradbury, McCaleb & Hinkle
Attys.

Jan. 22, 1935.  C. W. LANTER  1,988,692
BALING MACHINE
Filed Feb. 14, 1930  7 Sheets-Sheet 6

Inventor:
Clarence W. Lanter
By Williams, Bradbury, McCaleb & Hinkle
Attys.

Jan. 22, 1935.  C. W. LANTER  1,988,692
BALING MACHINE
Filed Feb. 14, 1930     7 Sheets-Sheet 7

Inventor:
Clarence W. Lanter
By Williams, Bradbury, M°Caleb & Hinkle
Attys

Patented Jan. 22, 1935

1,988,692

UNITED STATES PATENT OFFICE 1,988,692

BALING MACHINE

Clarence W. Lanter, Chicago, Ill.

Application February 14, 1930, Serial No. 428,287

16 Claims. (Cl. 100—1)

The present invention relates to baling machines, bales and methods of baling, and is particularly concerned with the baling of spring units for mattresses, cushions or the like.

It should be understood, however, that the present machine and method are not limited to the baling of any particular commodity and many of the features of the invention are of general application, and both the machine and method may be used for baling other forms of compressible raw material, merchandise, cushions, etc. The particular spring units described are to be regarded as exemplary of one of the many forms of material with which the invention may be used, but the machine and method are peculiarly adapted for the baling of spring units of the type shown in Suekoff Patent, No. 1,053,675, issued Feb. 18, 1913.

The spring units with which the machine is illustrated comprise casings of burlap or other fabric, having a plurality of separate spring chambers formed therein, in such manner that the springs are enclosed and supported in definite relation to each other in the casing, forming a spring unit which may be used in the manufacture of mattresses or cushions.

The exact form of the spring unit does not affect the merits of the present invention, except that the present machine is peculiarly adapted to bale units of the type illustrated in the above mentioned patent very economically and expeditiously, thereby reducing the cost of the finished product.

It should also be noted that the ordinary spring units are preferably provided with spiral coil springs having coils which decrease in diameter toward the center of the unit, with the largest coils at each end of the spring. The spring units are ordinarily of the same size as a mattress, but they must be compressed to a thickness of a fraction of an inch for baling, in order that they may be shipped economically.

The baling devices of the prior art are so constituted that it is necessary to sew the successive spring units together end to end before they are fed to the baling machine, and when the spring units are removed from the bale it is also necessary to cut the stitching which fastens the separate units together. This operation of sewing the spring units together requires a great deal of space, because the spring mattresses or units must be arranged to be sewed together, and generally sufficient mattresses must be sewed together to fill a bale, before the baling operation begins.

The expense of sewing the units together is an important factor in the cost of baling, on account of the additional labor and space required. The prior baling machines are also so constructed that much of the machine must be dismantled to remove the finished bale from the baling drum, and a great deal of time is consumed between the successive baling operations, in removing the bales and preparing the next lot of spring units.

One of the objects of the present invention is the provision of an improved baling machine which is adapted to be operated continuously in the baling of spring units, and the discharge of finished bales without the loss of time, expense and space which is involved in the use of the baling machines of the prior art.

Another object is the provision of an improved baling machine for spring units of the class described, which is adapted to bale the units without the necessity for the preliminary step of sewing the units end to end, thereby eliminating the loss of time and the expense involved in the latter operation.

Another object is the provision of an improved baling machine, including an automatic stripping device for removing the bales from the machines, thereby eliminating the loss of time and the cost of the labor necessitated by the removal of the drum in taking the bales from the machines of the prior art.

Another object is the provision of an improved method of bailing spring units for mattresses, and an improved bale of said units, which is provided with improved securing devices.

Another object is the provision of a more compact and efficient baling machine, which does not require so much space for its operation, and which may be operated more economically on account of the increased speed of operation, the adaptation of the machine to continuous baling, and the decreased cost of labor required.

Another object is the provision of an improved baling machine which does not injure the spring units in any way; which produces a desirable alignment and direct compression of the springs in the baling operation, and which is capable of continuous and efficient service without causing expense or loss of time for maintenance or repair.

Another object is the provision of a machine of the class described, which is adapted to provide a uniform compression of the spring units in the bale, a compact and efficient bale, and which is adapted to apply a wrapper or securing device of an improved type, so as to eliminate the necessity for sewing a wrapper about the bale in the manner which is necessary with the machines of the prior art.

Other objects and advantages of the invention will be apparent from the following description and from the accompanying drawings, in which similar characters of reference indicate similar parts throughout the several views.

Referring to the drawings, of which there are seven sheets;

Fig. 3 is a longitudinal, vertical, sectional view taken on the plane of the line 3—3 of Fig. 1;

Figures 12, 13, 14:
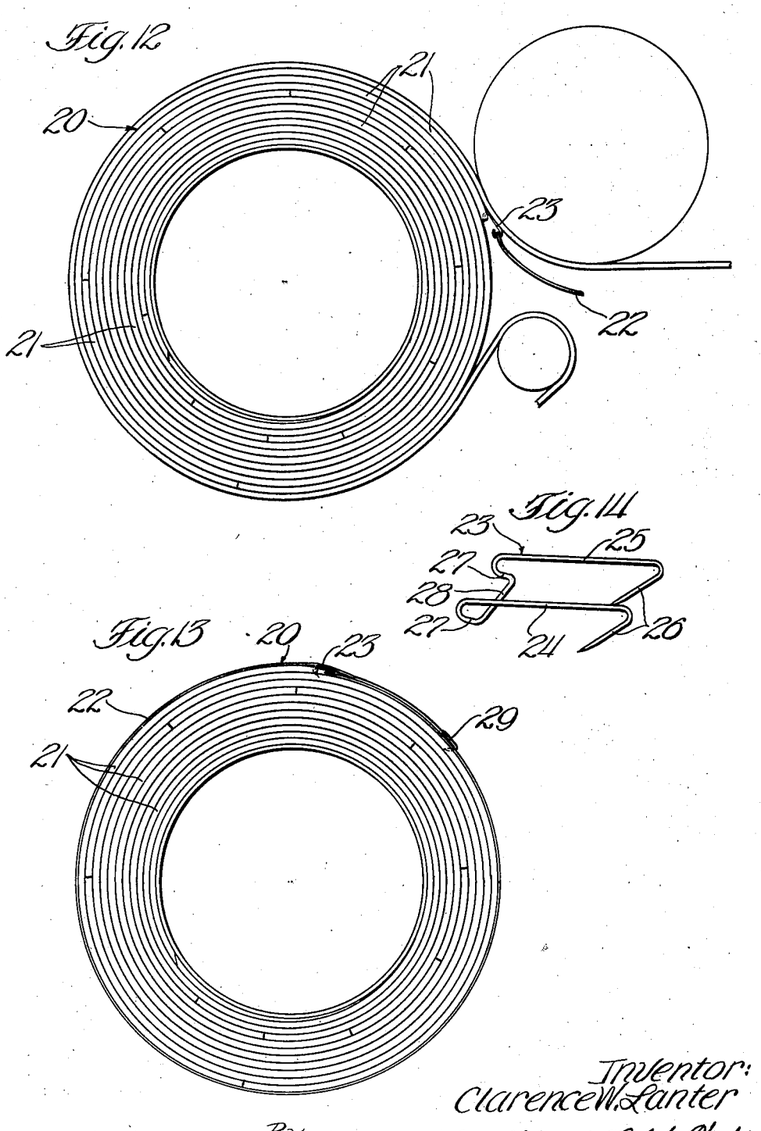
Fig. 12 is a side elevational view of the bale at the completion of the baling and the beginning of the application of the wrapper to the bale.
Fig. 13 is an end view of the finished bale.
Fig. 14 is a view in perspective of one form of securing hook for the wrapper.

The present machine can be most easily understood by first describing the nature of the finished bale, which is made by the machine and which is illustrated in Fig. 13.

The bale 20 comprises a plurality of the spring units 21, each of which has been compressed to a fraction of its normal thickness and wrapped into substantially cylindrical form upon a drum. For instance, the normal thickness of the spring unit might be about four inches, and the spring units are compressed in the bale to a thickness of about one-quarter inch. The spring units follow each other end to end in the roll or bale, and are wrapped spirally from the inside of the bale 20 toward the outside.

The bale must, of course, be maintained under compression continuously during the baling operation, and the wrapper 22 comprises a strip of burlap or other fabric, which is applied to the outside of the bale preferably before it leaves the machine, to hold the separate units 21 in compressed relation and spirally wound upon each other.

For this purpose the wrapper 22 is preferably provided with a plurality of hooks 23 which are located upon the opposite ends of the wrapper 22 and preferably equally spaced from each other upon the wrapper, in such manner as to extend from end to end of the bale 20.

The hook 23 illustrated in Fig. 14 is to be regarded as exemplary of but one of the many forms of hooks which may be employed, and it comprises a wire member which is bent back upon itself to form a pair of legs 24, 25, each of which is provided with a pointed hook 26 which extends backward and diagonally away from the legs 24, 25. The hooks 26 are thus pointed in such a direction that a pull upon the legs 24, 25 will draw the hooks 26 more firmly into the bale, and the hooks 26 are also adapted to be automatically pressed into the bale by the ordinary action of the baling machine.

The legs 24, 25 are each provided with a forward bend 27 which is joined by a yoke 28 in such manner that the yoke 28 may extend substantially parallel to the edge of the wrapper resting upon the bale in the machine, and maintaining the hooks 26 in proper position to be driven into the bale by the baling machine.

Both ends of the wrapper 22 being provided with a plurality of the hooks 23, the hooks 23 at one end of the wrapper may be hooked into the last spring unit 21, after which the normal operation of the baling machine and the rotation of the baling drum will apply the wrapper to the outside of the bale and the hooks 29 at the opposite end of the wrapper will be driven into the fabric of the spring units to secure the wrapper upon the bale.

When the compression of the machine upon the bale is released, the natural expansion of the spring units 21 will draw the hooks 23, 29 into firmer engagement with the bale, providing a finished bale which can be very readily unpacked by merely pulling out the hooks 29.

It should be noted that the bale 21 includes a considerable amount of potential energy, since a great number of metal springs in the spring units have been compressed to a fraction of their normal length, and it would not be possible to secure the bale 20 by the simple wrapper described, were it not for the fact that the unrolling of the bale must be accompanied by the sliding movement of the spring units or mattresses upon each other, and the friction between the respective wrappings of spring units is such that the wrapper 22 need only secure the outermost layers of the bale, while the innermost layers are held in compressed position by the friction between the units and by the outermost layers.

Figures 1, 6, 7:
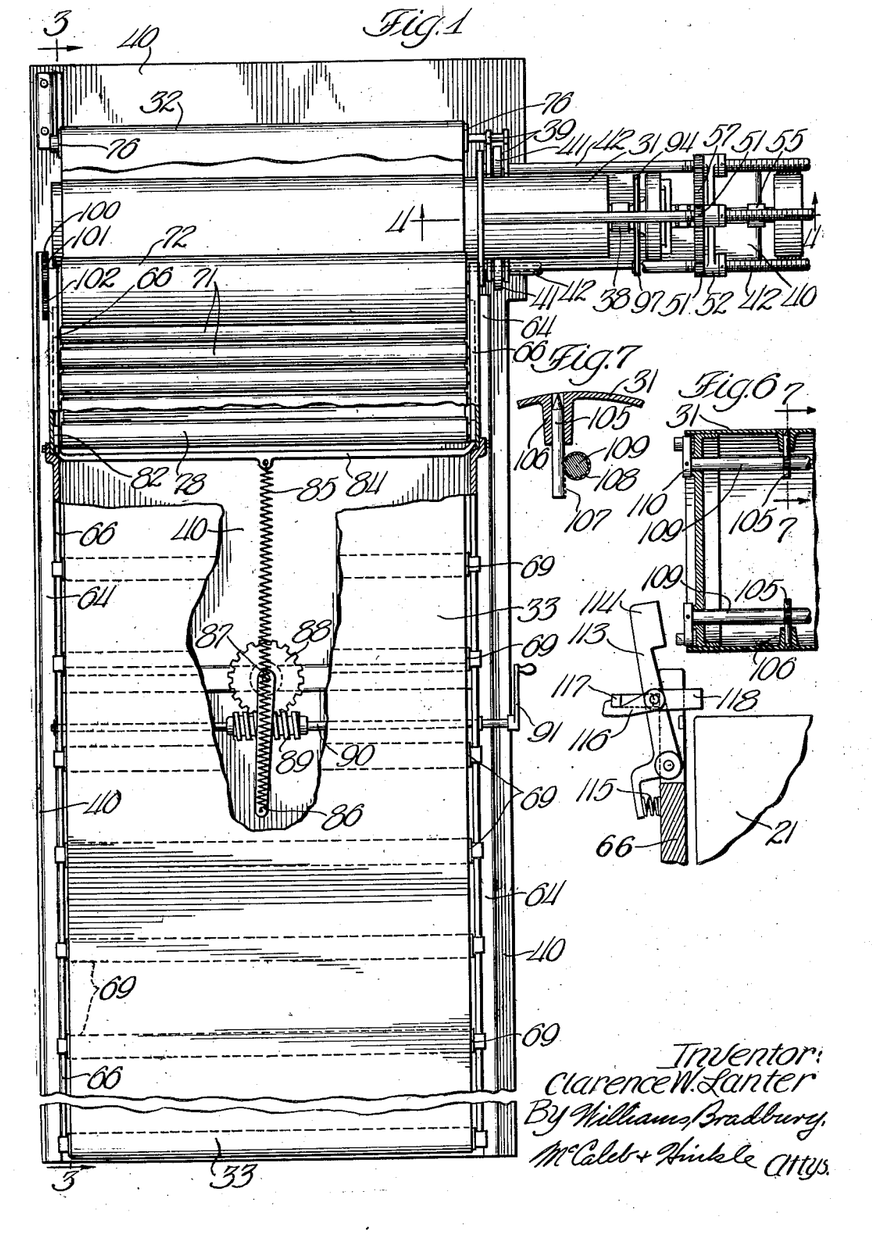
Fig. 1 is a plan view of the baling machine.
Fig. 6 is a transverse sectional view of one end of the drum, showing the releasable spring unit engaging members or pins for insuring the wrapping of the first spring unit on the drum.
Fig. 7 is a sectional view taken on the plane of the line 7—7 of Fig. 6.
Figure 2:
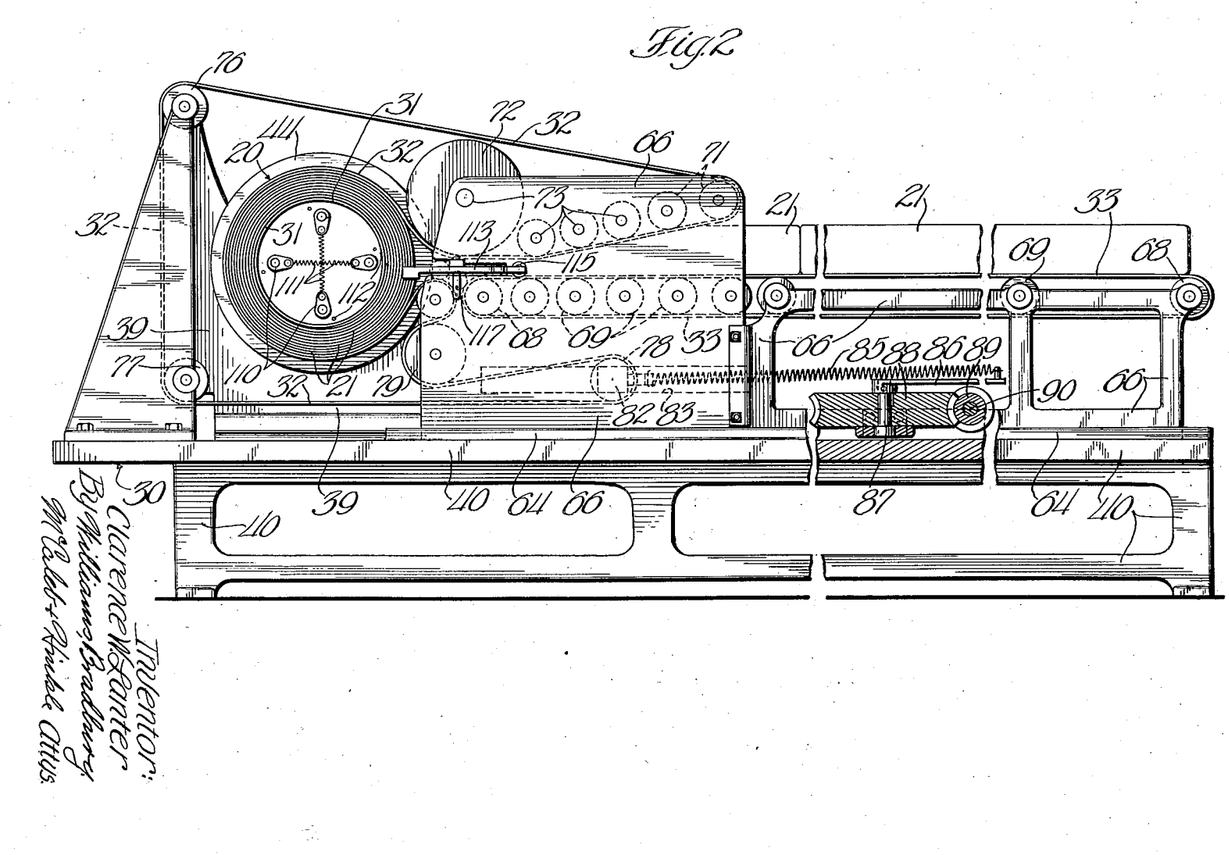
Fig. 2 is a side elevational view taken from the discharge side of the baling machine.

Referring to Figs. 1 to 3, the baling machines constructed according to the present invention, preferably include a supporting frame which is indicated in its entirety by the numeral 30, a drum 31 rotatably mounted upon said frame and means for compressing the spring units and feeding them in compressed condition to be wrapped upon the drum 31, which means may comprise the conveyor belts 32, 33 or the equivalent mechanisms which are illustrated in Figs. 8 to 11.

Figure 4:
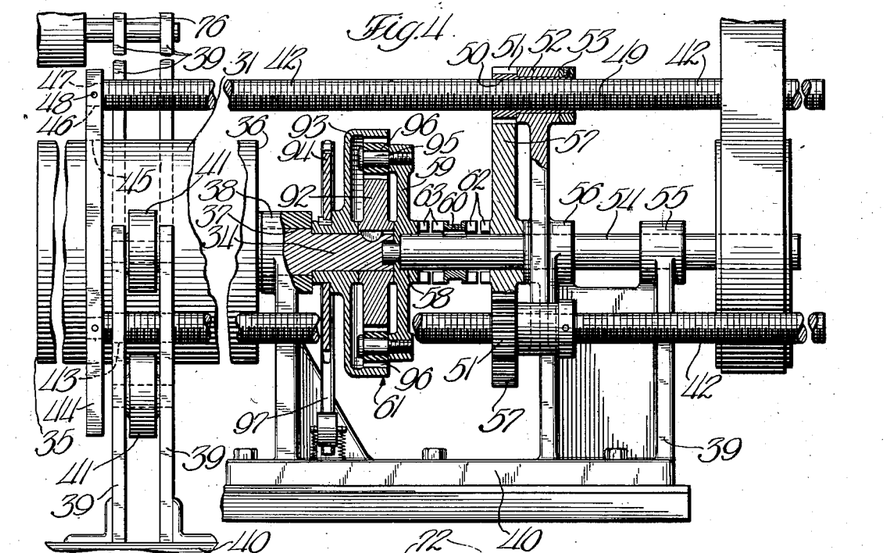
Fig. 4 is a vertical, sectional view taken on the plane of the line 4—4 of Fig. 1, through the drive mechanism for the drum, stripping device and feeding devices.

The present machine is preferably provided with an improved drum and stripping mechanism of the type illustrated in Fig. 4, but it should be understood that the ordinary type of drum and supporting mechanism may be employed while still utilizing many of the other features of the invention.

Referring to Fig. 4, the drum 31 may comprise a substantially cylindrical metal member or framework which may be fixedly mounted upon a shaft 34, and in order to provide for the convenient discharge of the bales 20 from the drum 31, one end of the drum, such as the end illustrated in Fig. 2, is adapted to be conveniently opened or otherwise freed from obstruction for the discharge of the bales.

For this purpose, the end 35 of drum 31 may be provided with a conveniently removable bearing if desired, but the drum 31 is preferably rotatably mounted for support from the opposite end 36 by means of the shaft 34, which is provided with a journal 37 rotatably mounted in bearing 38.

Since the drum 31 is ordinarily of considerable weight and the drum also supports the weight of the bale 20, the drum 31 is also preferably provided with additional means of support spaced from the bearing 38 and preferably located between the ends of the drum, such as the framework 39 which is carried by the base 40 and which is provided with a plurality of rollers 41 for engaging the cylindrical surface of drum 31, supporting the major portion of the weight of the drum and maintaining the drum in proper position with respect to the bearing 38.

Referring to Fig. 3, it will be observed that two of the rollers 41 have been located below the drum 31, while the other two rollers 41 are located substantially in the plane of the axis of the shaft 34 to prevent lateral movement of the drum 31. The framework 39 may consist of a pair of arcuate metal members for extending about the drum 31, and providing pivotal support for rollers 41, as well as guides for the stripping mechanism further to be described.

Referring again to Fig. 4, it will be observed that on account of the auxiliary support provided by the framework 39 and rollers 41 for drum 31, the drum must be made somewhat longer than the length of the finished bale, and the bale 20 is intended to be wrapped upon that portion of the drum 31 which has been broken off at the left of Fig. 4. The framework 39 also provides guides for a plurality of shafts 42 which are slidably mounted in bores 43 in the framework 39, and the shafts 42 comprise a part of the actuating mechanism for a stripping ring 44.

The stripping ring 44 may comprise an annular metal member having a central aperture 45 of sufficient size to slidably receive the drum 31 and being of sufficient width in a radial direction to substantially cover the end of a bale 20. The ring 44 may be fixedly secured to the shafts 42 by locating the reduced end 46 of each shaft in a bore 47 and securing the shaft by a pin 48.

Referring to Fig. 1, it will be observed that three of the shafts 42 have been shown for the purpose of pushing and returning the stripping ring 44, and the shafts are preferably located at equal angular displacements with respect to the circumference of the drum 31, but any number of actuating shafts may be employed.

Each of the shafts 42 is provided with a screw thread 49 adapted to be engaged by the internal screw threads located in the bore 50 of a pinion 51. Each of the pinions 51 is preferably mounted upon a thrust bearing 52 carried by the base 40 and the pinion 51 may be provided with a thrust collar 53 upon the opposite side of bearing 52 to permit the rotation of pinions 51, but prevent reciprocation in the bearing 52. If desired, the thrust bearing 52 may be provided with any form of anti-friction or ball bearings.

The shaft 54 (Fig. 4) may consist of a continuously driven power shaft which is rotatably mounted in the bearings 55, 56, spur gear 57 and bore 58 of the spider 59. The power shaft 54 is, however, keyed to a clutch collar 60 which is slidably, but non-rotatably mounted on shaft 54 between spur gear 57 and spider 59 of a planetary gearing indicated in its entirety by the numeral 61. Any form of inter-engaging surfaces or clutch may be provided on the member 60, such as the inter-engaging shoulders 62 and 63 so that when the clutch is in the position shown in Fig. 4, the power shaft 54 rotates freely, but the clutch 60 may be moved to the right to actuate spur gear 57 or to the left to actuate the spider 59. The stripping mechanism may thus be actuated at any time by moving the clutch 60 into engagement with spur gear 57, rotating spur gear 57 and each of the three pinions 51, the pinions engaging the screw threads 49 on shafts 42 and moving the stripping ring 44 to the left in Fig. 4 to push the bale off the drum 31.

The stripping mechanism may be provided with an automatic reversing mechanism of any conventional type (not shown) for returning the stripping ring 44 to the position of Fig. 4 as soon as the bale has been discharged from the cylinder 31, or the direction of rotation of the power shaft 54 may be reversed to withdraw the stripping mechanism to the normal position of Fig. 4.

Referring to Figs. 2 and 3, the drum 31 is preferably disposed with respect to the compressing and feeding conveyors 32, 33 in such manner as to receive the compressed spring units 21 and continuously maintain the spring units under compression during the wrapping operation. As the spring units 21 are wrapped upon the drum 31, the outside diameter of the roll or bale continually increases, and consequently it is desirable that the drum 31 and the feeding mechanism shall be mounted movably with respect to each other, so that the feeding mechanism may move away from the drum progressively as the size of the bale increases.

Figure 5:
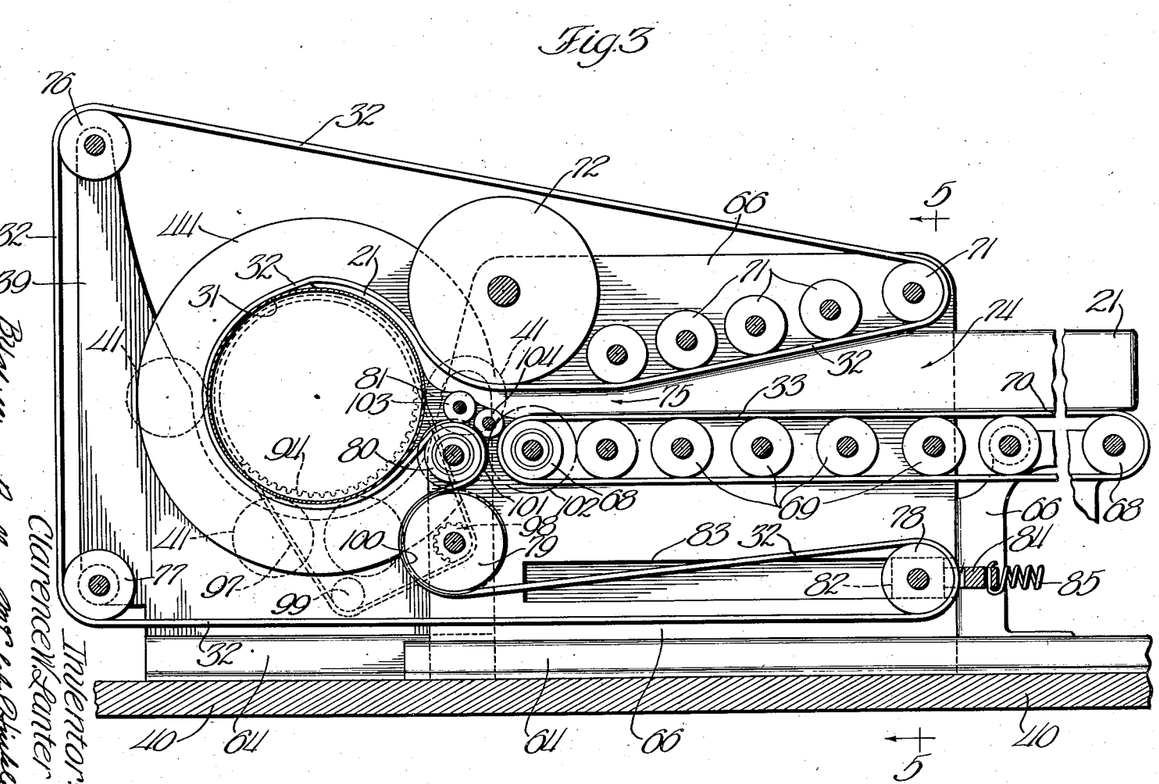
Fig. 5 is a vertical, sectional view taken on the plane of the line 5—5 of Fig. 3.

For this purpose, the base 40 of the machine is preferably provided with guides 64 (Fig. 5) for slidably receiving the base 65 of a supporting frame 66 for the conveyor belts 32, 33. Any convenient form of framework 66 may be provided having a plurality of bearings 67 for the conveyor belt supporting rolls 68.

Referring to Fig. 3, the lower or supporting conveyor belt 33 may comprise a continuous flexible belt of fabric, leather, rubber composition or other appropriate material which is rotatably supported upon the belt rolls 68 or equivalent mechanism. The belt 33 is provided with additional means of support at that end which is adjacent the drum 31 and below the belt 32, in the form of such number of additional conveyor belt rolls 69 as is necessary to provide the requisite degree of stiffness in the belt at this point to uniformly compress the spring units 21.

Referring to Fig. 3, it will be observed that the conveyor 33 has been broken off at the point 70 to indicate that a greater length of conveyor may be employed. If desired, the conveyor belt 33 may be only long enough to act as a feeding mechanism for the drum 31, but in other embodiments of the machine, the conveyor belt 33 may be made of sufficient length to receive a considerable number of mattress units 21 such as a sufficient number to make a bale, or the conveyor belt 33 may be adapted to convey the finished mattress units from some other part of the factory directly to the baling machine, and its length under such conditions will depend upon the specific arrangement of the installation.

The framework 66 may also be extended above the conveyor belt 33 at both sides of the belt, to provide a movable support for the conveyor belt rolls 71, 72 which are located to hold the belt 32 in position to compress the spring units 21 against the belt 33. The framework 66 is thus provided with a plurality of bearings 73, the successive bearings being each located nearer to the belt 33 as they approach the drum 31, and the conveyor belt rolls 71 are thus adapted to support the belt 32 to form a continuously decreasing opening between the belts 32 and 33.

The opening at the point 74 is sufficient to permit the mattress units to be received between the belts 32 and 33, after which further movement of the mattress unit to the left in Fig. 3 causes the unit to be compressed to the thickness shown at the point 75.

The conveyor belt roll 72 may be of a larger diameter for the purpose of gradually effecting the remaining amount of compression of the mattress unit 21 and supporting the belt 32 to form a gradually decreasing opening or slot between the belt 32 and the drum 31.

In order to support the conveyor belt 32 in such manner that it may pass continuously about the drum 31 and also permit the relative expansion of the belt portion about the drum 31 as the size of the bale increased, the framework 40 adjacent the drum 31 is also provided with an upper conveyor belt roll 76 and a lower conveyor belt roll 77. The framework 66 is provided with a movably mounted conveyor belt roll 78, with a driving roll 79 and with a roll 80 located to draw the belt 32 completely about the drum 31 with the exception of the feeding opening 81.

The belt 32 may thus consist of a continuous conveyor belt of the same characteristics as the conveyor belt 33, and its course may be described as follows. Beginning at the belt roll 71 and proceeding in the direction of movement of belt 32, the belt 32 proceeds underneath the rolls 71, gradually approaching belt 33, after which it passes underneath the large roll 72, which is one of the rolls for maintaining the belt 32 closely about drum 31. Thence the belt 32 passes about the drum 31 in a counter-clockwise direction to the roll 80 which is also situated to draw the belt closely about drum 31.

Belt 32 proceeds in a clockwise direction above and around roll 80, thence to the left of drive roll 79 and under drive roll 79 over substantially horizontally to the tensioning roll 78. After passing about roll 78, belt 32 passes over to the left underneath roll 77, upward over roll 76 and downward again to roll 71.

The tensioning roll 78 is slidably mounted in framework 66 by bearings 82 which slide in guides 83. The bearings 82 are connected to a yoke 84 which may be connected to a spring 85 of sufficient size and length to provide the degree of tension required on the belt 32.

The opposite end of spring 85 may be connected to a tension releasing device consisting of a toggle lever 86 which is fixedly mounted on a shaft 87 having a gear 88 actuated by the screw 89 on a horizontal shaft 90 by means of crank 91. When the lever 86 has been moved to the position of Fig. 2, the lever is automatically held in this position by the locking of the worm and worm gear 88, 89, but the tension on spring 85 may be quickly released by rotating the crank 91 until the lever 86 extends in the opposite direction. The release of the tension on the tension roll 78 also releases the tension upon the belt 32 about the drum 31, and permits the stripping mechanism 44 to remove the bale from the drum 31 with greater facility.

The tension roll 78 is also adapted to move towards the left in Fig. 3 during the baling operation, paying out the excess length of the belt 32 to permit the enlargement of the bale as the baling progresses and also permitting the entire frame 66 to move to the right away from the drum 31 as the size of the bale increases.

Referring to Fig. 3, it will be observed that the peripheral speed of the belt 32 and that of the drum 31 is substantially the same at the beginning of the baling operation, but that as the bale increases in size, the peripheral speed of the belt 32 must increase in order to feed the spring units 21 to the drum 31 at the speed which is determined by the instantaneous rate of travel of the periphery of the bale.

In order to provide for the automatic regulation of the driving of the belt 32 and the drum 31 from the beginning of the baling until the completion of the baling operation, the drive mechanism illustrated in Fig. 4 is preferably provided with a planetary gear 61 having a pair of driven members 92 and 93, the relative speed of each of which depends upon the resistance encountered by the other driven member and its connected mechanism. Thus the drum shaft 34 may be keyed to rotate with the spur gear or driven member 92 and the drum shaft 34 may rotatably support the internal gear or driven member 93 which is keyed to the drive sprocket 94.

The drive shaft 54 may, through the operation of clutch 60, drive the spider 59 which is provided with a plurality of journals 95 for rotatably supporting the pinions 96 between spur gear 92 and internal gear 93. It will be evident that when the clutch 60 is in position to drive the spider 59, the rate of speed of drive of the internal gear 93 and spur gear 61 depends upon the resistance encountered to the movement of each of these members and their interconnected mechanism.

The sprocket wheel 94 may be connected by means of a drive chain 97 to another sprocket wheel 98 which is mounted to rotate with the shaft of the drive roll 79. The drive chain 97 also passes over a resiliently mounted idler 99 so that the chain 97 may be of sufficient length to permit the framework 66 and its associated mechanism, together with sprocket wheel 98, to move away from the drum 31 and sprocket 94 as the size of the bale increases.

The drive roll 79 rotates in a counter-clockwise direction and it is preferably geared or otherwise mechanically connected by a gear 100 to a gear 101 on the roll 80 which rotates in a clockwise direction. Any number of drive rolls for the respective belts may be provided in order to insure the driving of the belts without slippage.

The gear 101 which rotates clockwise, may mesh with another gear 102 carried by the end roll 68 which supports the conveyor belt 33, and thus the end roll 68 will be rotated in a counter-clockwise direction to move the upper portion of belt 33 in a feeding direction.

The present arrangement of gears and driving mechanism is to be regarded as exemplary of one of the many forms of gearing which may be employed, and the gearing is preferably so arranged that the belt 32 will move at a slightly greater speed than the belt 33 in order to feed the spring units 21 slightly faster at their outer circumference on the drum 31.

Since the drum 31 is driven by one of the driven members from planetary gear 61 and the belt 32 from the other of the driven members of planetary gear 61, it will be evident that the drum may automatically decrease its speed to corrspond to the peripheral speed of the belt 32 as the size of the bale increases, or the speed of the belt and drum respectively, is mutually adjusted to correspond to the size of the bale at any time.

Referring to Fig. 3, it will be observed that that portion of the belt 32 which passes over roll 80, is moving in a direction opposite to the direction of feed of the spring unit 21, and consequently it is preferred to insert at this point one or more idler rollers 103, 104, rotatably mounted upon frame 66 in engagement with the belt 32 on roll 80. The roll 80 being driven clockwise, the idler rolls 103, 104 will rotate in a counter-clockwise direction and aid in the compressing and feeding action of the machine upon the spring units 21.

The drum 31 is preferably provided with a plurality of mattress engaging members 105 located at regularly spaced points on the periphery of drum 31 to engage the first mattress or spring unit and assure the correct feeding of the first mattress. After the mattresses have begun to form a bale, the friction between the envelopes of successive mattresses is sufficient together with the feeding action of the conveyor belts 32, 33, and in some embodiments of the invention no mattress engaging elements 105 will be needed on the drum.

Where it is desirable to provide such additional feeding members, they may consist of a plurality of pins 105 slidably mounted in guides 106 in drum 31, the pins being formed with racks 107 for engagement with pinions 108 carried by shafts 109. The shafts 109 may be provided with cranks 110 and the cranks 110 which are diametrically opposite each other, may be connected by coil springs 111 in such manner that when the cranks are rotated to the position of Fig. 6, the springs 111 are tensioned and the cranks 110 with springs 111 form toggles which are held in such position by the crank having passed its dead center into engagement with a stop pin 112.

The pins 105 will thus be located at the beginning of the baling operation so that they are withdrawn into drum 31 to be projected therefrom to engage the spring units as they are fed to the drum, but when the formation of the bale 20 has been completed, the pins 105 must be withdrawn for the stripping operation, and they may be returned to the position of Fig. 7 by rotating the cranks 110 into engagement with stop pins 112. The pinions on shafts 109 will withdraw pins 105 into cylinder 31, and the springs 111 will then hold the cranks 110 in the position of Fig. 6.

To accomplish the automatic tripping of the cranks 110, the framework 66 may be provided with a tripping lever 113 which is arranged to effect the tripping operation as soon as the spring units are fed to the drum. The tripping lever 113 has a head 114 adapted to be projected into engagement with cranks 110 and the lever is biased into crank engaging position by a compression spring 115.

At the beginning of the baling operation, however, the tripping lever 113 is latched in the position of Fig. 6 by a latch 116 pivotally mounted on lever 113 and engaging a keeper 117. The opposite end 118 of latch 116 projects into the path of movement of the spring units, and as soon as mattresses or spring units are fed to the machine, they engage end 48, tripping the latch 116 and releasing the tripping lever 113 to engage with cranks 110 as they successively come into position, tripping lever 114 by the rotation of the drum 31. The pins 105 will thus be automatically projected from the drum 31 to insure the feeding of the spring units but they may be withdrawn for the stripping of the bale as soon as the bale has been completed.

Referring to Fig. 12, the bale of spring units is here diagrammatically illustrated just after the completion of the bale and before the application of the wrapper. The operators of the machine may attach the wrapper to the last spring unit 21 by means of the hooks 23 previously described, and the wrapper 22 will thus be fed about the bale 20 and tensioned in exactly the same manner as the spring units are wrapped upon drum 31. The wrapper 22 is preferably made of sufficient length to extend about the bale 20 and overlap at its ends, and as the wrapper reaches the position of Fig. 13, the upper belt 32 or equivalent mechanism drives the points 26 of the hooks 29 into the wrapper and outer spring units to secure the wrapper on the bale as previously described.

The present method of baling spring units, mattresses or other resilient articles eliminates the necessity for sewing together end to end the respective mattresses and the mattresses may be fed into the machine as separate units. As the mattresses progress in the machine, they are first compressed to the desired condition of thickness and compression, after which they are wrapped upon the drum 31 to form a roll of spiral layers and the bale may be secured in the compressed condition by merely hooking a wrapper to the last spring unit, wrapping the wrapper about the bale and hooking the opposite end of the wrapper into the bale. This also eliminates the sewing of wrappers about the finished bales and provides a bale which is more economically made and more easily opened.

Figures 8, 9:
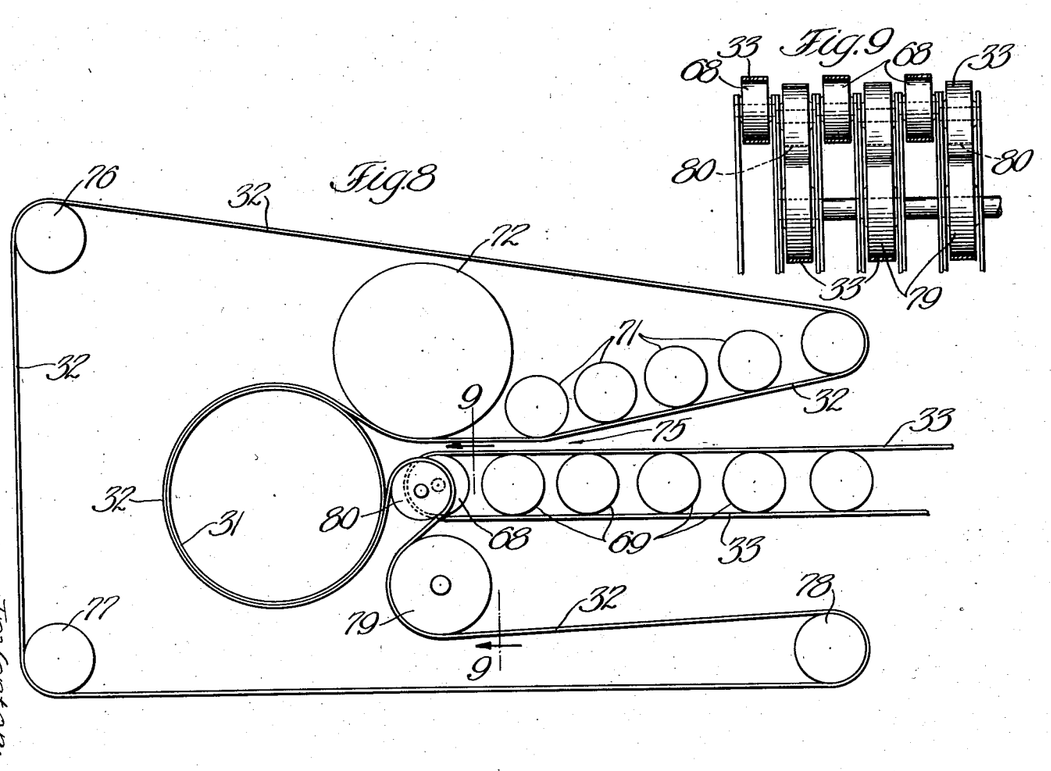
Fig. 8 is a diagrammatic view similar to Fig. 3, of a modified form of apparatus utilizing a plurality of relatively narrow conveyor belts.
Fig. 9 is a vertical section taken on the plane of the line 9—9 of Fig. 8.

Referring to Figs. 8 and 9, these are diagrammatic illustrations of a modified form of apparatus in which the idler rolls 103, 104 have been eliminated, but each of the conveyors 32 and 33 consists of a plurality of relatively narrow belts spaced from each other with the belts located between each other at the rolls 68 and 80. The roll 68 has been replaced by a plurality of separate pulleys 68 which are located alternately between pulleys 80, which perform the function of rolls 80 previously described. Thus the pulleys 68 of Fig. 8 may be located slightly above the pulleys 80 and although the belt on the pulley 80 is moving in a counter-clockwise direction contrary to the direction of feed of the spring units, the spring units are supported by the belt 33 on pulleys 68, and the location of the pulleys 68 between pulleys 80 prevents any interference by the pulley 80 with the feeding of the mattress.

Figures 10, 11:
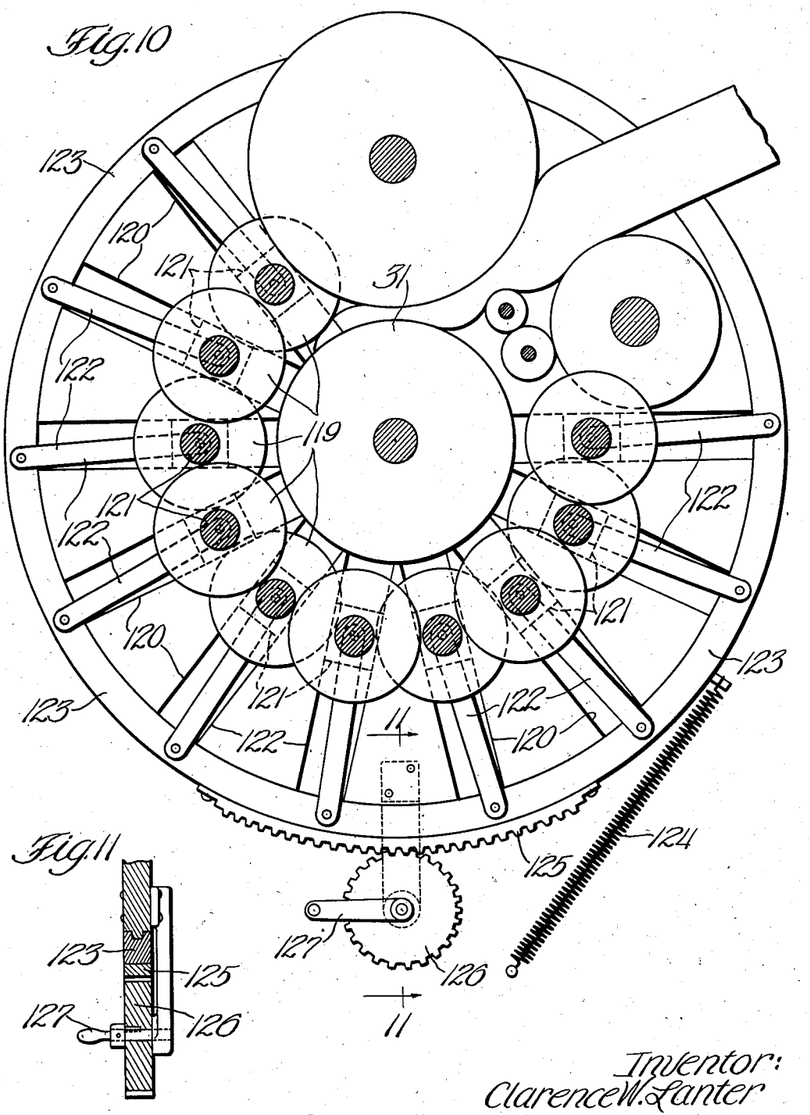
Fig. 10 is a diagramatic view of a modified form of mechanism for compressing the spring units, feeding them to the drum and maintaining the state of compression during the baling operation.
Fig. 11 is a sectional view taken on the plane of the line 11—11 of Fig. 10.

Referring to Figs. 10 and 11, these are diagrammatic illustrations of a modified mechanical form of feeding and compressing apparatus, in which the conveyor belts 32 and 33 have been completely replaced by other mechanical agencies such as a multiplicity of compressing pulleys 119. The supporting frame for the machine includes a plurality of guides 120 for slidably supporting the bearings 121 of the pulleys 119, and each of the bearings 121 is adapted to be moved by a connecting link 122 which is pivotally connected to a ring 123. The links 122 are normally in the position shown in Fig. 10, and the ring 123 is urged to rotate in a clockwise direction by the spring 124. The ring may also be provided with a rack 125 capable of being actuated by gear 126 and crank 127.

It will be evident that as the size of the bale increases, the bale itself will force out the pulleys 119 and the pulleys acting on the links 122 will force the ring 123 in a counter-clockwise direction so that the rotation of the ring will permit the uniform radial movement of the pulleys 119. When it is desired to strip the finished bale from the drum 31, the crank 127 may be used to turn the ring 123 in a counterclockwise direction and remove pressure from the outside of the bale.

It will thus be observed that I have invented an improved baling machine which is capable of the continuous operation of compressing and wrapping spring units and other resilient articles into a substantially cylindrical bale, without the necessity for sewing such units together, and the present machine requires but a small fraction of the space which is necessary in the employment of the baling methods of the prior art. The finished bale may be stripped from the machine automatically, without removing the drum from the machine and without dismantling the machine as has been necessary with the devices of the prior art, and since the machine requires no preliminary sewing operations, nor dismantling the machine for removing the bale, it is capable of substantially continuous baling.

The present method may be carried out by any of a plurality of different machines, several examples of which have been illustrated, and the method results in an improved bale which is more economically produced and more firmly secured than the devices of the prior art.

The present method and machine is also adapted to bale sheets of relatively thin material such as sheets of paper, cloth, leather, flexible metal and other relatively non-compressible materials in pieces, which may be fed overlapping or end to end to form a wrapped bale, which is secured by an appropriate wrapper or bands. It may also be used for wrapping a single mattress or unit into a relatively compact bale.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a baling machine, the combination of a horizontal baling drum with a frame for rotatably supporting said drum from one end, an annular stripping member surrounding said drum and adapted to engage the end of a bale on said drum, said stripping member being located normally at the supported end of said drum, a plurality of actuating plungers for said stripping member, and operative gearing for simultaneously reciprocating said actuating plungers to drive a bale off said drum.

2. In a baling machine, the combination of a horizontal baling drum with a frame for rotatably supporting said drum from one end, an annular stripping member surrounding said drum and adapted to engage the end of a bale on said drum, said stripping member being located normally at the supported end of said drum, a plurality of actuating plungers for said stripping member, operative gearing for simultaneously reciprocating said actuating plungers to drive a bale off said drum, and auxiliary bearing means for said drum for engaging said drum between said supported end and the free end of said drum.

3. In a baling machine, the combination of a supporting frame, with an auxiliary frame movably mounted with respect to the supporting frame, a baling drum rotatably mounted on said auxiliary frame at one end, and having its opposite end free, a feeding belt movably supported on said supporting frame, and a compressing belt movably supported on said supporting frame and passing around said drum, said compressing belt being located adjacent said feeding belt to form a feeding and compressing opening of tapering width.

4. In a baling machine, the combination of a supporting frame, with an auxiliary frame movably mounted with respect to the supporting frame, a baling drum rotatably mounted on said auxiliary frame at one end, and having its opposite end free, a feeding belt movably supported on said supporting frame, a compressing belt movably supported on said supporting frame and passing around said drum, said compressing belt being located adjacent said feeding belt to form a feeding and compressing opening of tapering width, and means for maintaining a predetermined tension on said belt and urging said auxiliary frame toward said supporting frame.

5. In a baling machine, a baling drum and a pair of baling belts, means for movably supporting one belt to form a movable supporting table for baling material, and means for supporting the other belt about said drum, and extending in spaced relation to said table, the space between said table and other belt increasing in width in a direction away from said drum, whereby baling material is engaged on both sides by said belts and fed in predetermined direction about said drum.

6. In a baling machine, a baling drum and a pair of baling belts, means for movably supporting one belt to form a movable supporting table for baling material, means for supporting the other belt about said drum, and extending in spaced relation to said table, the space between said table and other belt increasing in width in a direction away from said drum, whereby baling material is engaged on both sides by said belts and fed in predetermined direction about said drum, said other belt passing backward about supporting members located outside and spaced from said drum, said other belt passing outside said supporting members about said drum.

7. In a baling machine, a baling drum and a pair of baling belts, means for movably supporting one belt to form a movable supporting table for baling material, means for supporting the other belt about said drum, and extending in spaced relation to said table, the space between said table and other belt increasing in width in a direction away from said drum, whereby baling material is engaged on both sides by said belts and fed in predetermined direction about said drum, and means for driving the belt extending about said drum at a greater speed than said first-mentioned belt to bale a spring unit with the springs compressed substantially in an axial direction.

8. In a baling machine, a baling drum and a pair of baling belts, means for movably supporting one belt to form a movable supporting table for baling material, means for supporting the other belt about said drum, and extending in spaced relation to said table, the space between said table and other belt increasing in width in a direction away from said drum, whereby baling material is engaged on both sides by said belts and fed in predetermined direction about said drum, rollers for drawing said other belt closely about said drum forming an opening adjacent the end of said table, and means for guiding baling material between said other belt and said drum.

9. In a baling machine, a plurality of rollers located to support a first belt as a supporting table, a plurality of other rollers located to support a second belt diagonally above said table, a drum about which said second belt passes, and rollers engaging said second belt between said table and drum to draw said second belt about the major part of the periphery of said drum.

10. In a baling machine, a plurality of rollers located to support a first belt as a supporting table, a plurality of other rollers located to support a second belt diagonally above said table, a drum about which said second belt passes, rollers engaging said second belt between said table and drum to draw said second belt about the major part of the periphery of said drum, one of said first mentioned rollers being located to prevent engagement of the baling material with the oppositely moving belt over one of said latter rollers.

11. In a baling machine, a plurality of rollers located to support a first belt as a supporting table, a plurality of other rollers located to support a second belt diagonally above said table, a drum about which said second belt passes, rollers engaging said second belt between said table and drum to draw said second belt about the major part of the periphery of said drum, and guide means located between said second belt and said first belt where the former passes over one of the latter rollers and moves in a direction contrary to the direction of feed.

12. In a baling machine, the combination of a drive shaft, with a drum, planetary gearing driven by said shaft, a pair of belts arranged to gradually compress baling material and wrap it about said drum, said belts and drum being driven from said planetary gearing, a stripping device located about said drum, and means for selectively connecting said planetary gearing or stripping device to said drive shaft.

13. In a baling machine, the combination of a drive shaft, with a rotatable drum, a feeding device for wrapping compressed resilient units on said drum, a planetary gear having a pair of driven members, operative mechanical connections between one of said driven members and said drum, and operative mechanical connections between the other of said driven members and said feeding device whereby the rate of feed of the material to be baled and the speed of rotation of the drum is mutually adjusted.

14. In a baling machine, the combination of a rotatable drum for supporting wrapped bales, a conveyor belt for supporting and feeding resilient units to said drum, a second conveyor belt having supporting means arranged with respect to said first mentioned belt to progressively compress said units, said belts being movably mounted with respect to said drum to maintain said drum in unit receiving position with respect to said conveyor belts.

15. In a baling machine, the combination of a rotatable drum for supporting wrapped bales, a conveyor belt for supporting and feeding resilient units to said drum, a second conveyor belt having supporting means arranged with respect to said first mentioned belt to progressively compress said units, said belts being movably mounted with respect to said drum to maintain said drum in unit receiving position with respect to said conveyor belts, and one of said belts extending about said drum to maintain said units in compressed relation during the baling operation.

16. In a baling machine, the combination of a rotatable drum for supporting wrapped bales, a conveyor belt for supporting and feeding resilient units to said drum, a second conveyor belt having supporting means arranged with respect to said first mentioned belt to progressively compress said units, said belts being movably mounted with respect to said drum to maintain said drum in unit receiving position with respect to said conveyor belts, and one of said belts extending about said drum to maintain said units in compressed relation during the baling operation, said latter belt being mechanically connected to be driven at a greater speed than the other belt to place the compressed units under substantially radial compression in the finished bale.

CLARENCE W. LANTER.